(12) United States Patent
Kerestecioglu et al.

(10) Patent No.: US 10,449,482 B2
(45) Date of Patent: Oct. 22, 2019

(54) USE OF EXPANSION MACHINES IN GAS SCRUBBERS

(71) Applicant: LINDE AKTIENGESELLSCHAFT, Munich (DE)

(72) Inventors: Ulvi Kerestecioglu, Geltendorf (DE); Alexander Prelipceanu, Munich (DE); Anna-Maria Fischer, Munich (DE); Stephan Zehrer, Munich (DE); Jan-Peter Bohn, Starnberg (DE); Katrin Giese, Munich (DE); Thomas Hummel, Munich (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/672,375

(22) Filed: Aug. 9, 2017

(65) Prior Publication Data

US 2018/0169570 A1 Jun. 21, 2018

(30) Foreign Application Priority Data

Aug. 25, 2016 (DE) .................. 10 2016 010 314

(51) Int. Cl.
 *B01D 53/14* (2006.01)
(52) U.S. Cl.
 CPC ..... *B01D 53/1462* (2013.01); *B01D 53/1425* (2013.01); *B01D 53/1493* (2013.01); *B01D 2252/2021* (2013.01)

(58) Field of Classification Search
 CPC ............ B01D 53/1425; B01D 53/1462; B01D 53/1493; B01D 2252/2021
 See application file for complete search history.

(56) References Cited

U.S. PATENT DOCUMENTS

| 3,824,766 | A  | * | 7/1974 | Valentine | ........... | B01D 53/1462 |
|           |    |   |        |           |             | 95/163 |
| 2011/0203313 | A1 | * | 8/2011 | Huda | ........................ | C01B 3/12 |
|           |    |   |        |           |             | 62/617 |
| 2015/0165366 | A1 | * | 6/2015 | Brandl | ............... | B01D 53/1468 |
|           |    |   |        |           |             | 95/187 |

* cited by examiner

*Primary Examiner* — In Suk C Bullock
*Assistant Examiner* — Jason Y Chong
(74) *Attorney, Agent, or Firm* — Millen White Zelano & Branigan, PC

(57) ABSTRACT

A method for operating a gas scrubber is disclosed in which components are removed from a crude gas by scrubbing with a chemical or physical scrubbing medium to obtain a pure gas present at elevated pressure which, after heating, is introduced into an expansion machine which after work-performing decompression the pure gas leaves at an exit temperature. The amount of heat supplied to the pure gas during heating thereof is deliberately altered to approximate the exit temperature thereof to a predetermined target value at all times.

4 Claims, 1 Drawing Sheet

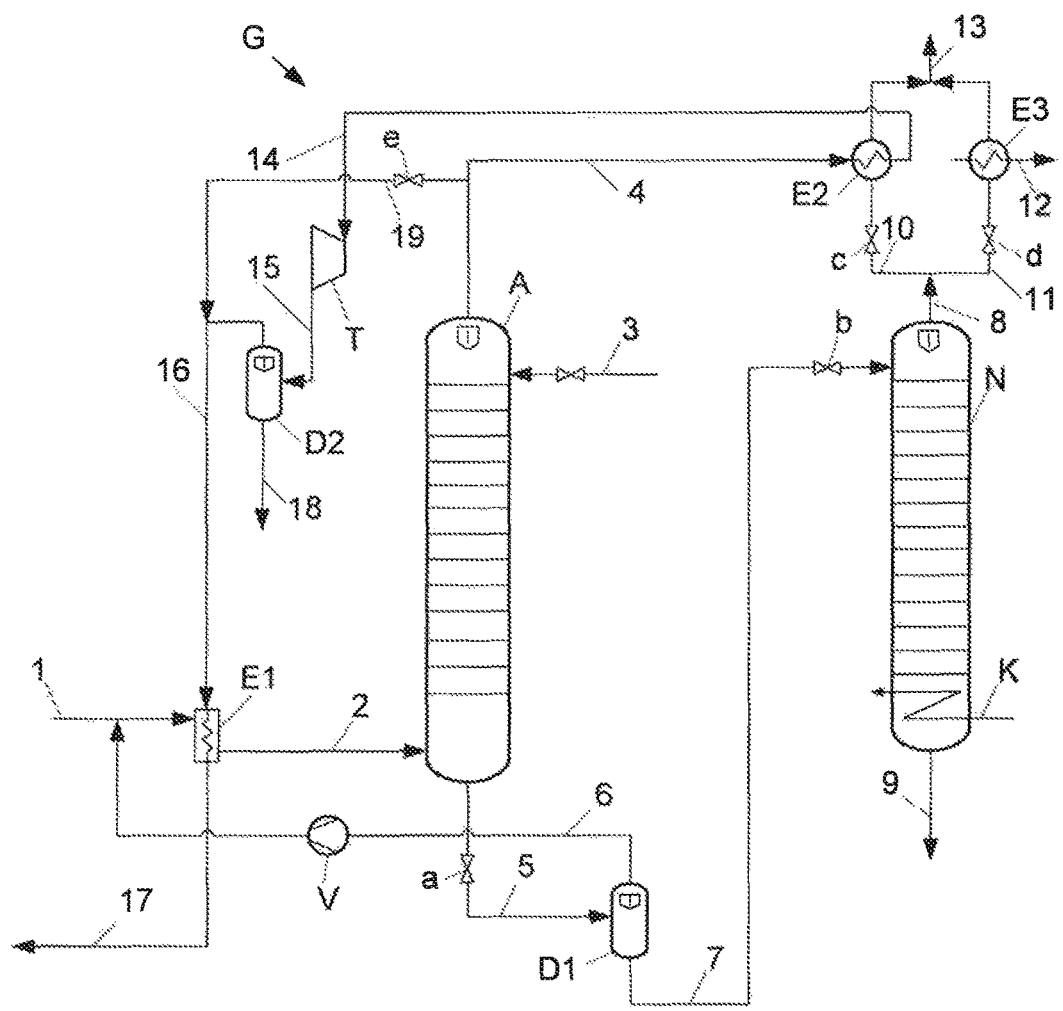

USE OF EXPANSION MACHINES IN GAS SCRUBBERS

CROSS REFERENCE TO RELATED APPLICATIONS

This application claims priority from German Patent Application DE 102016010314.0 filed on Aug. 25, 2016.

BACKGROUND OF THE INVENTION

The invention relates to a method for operating a gas scrubber in which components are removed from a crude gas by scrubbing with a chemical or physical scrubbing medium to obtain a pure gas present at elevated pressure which, after heating, is introduced into an expansion machine which after work-performing decompression the pure gas leaves at an exit temperature.

A process of the type in question is known for example from patent specification U.S. Pat. No. 3,824,766. Therein, natural gas is subjected to a scrubbing operation with a physical carbon-dioxide-saturated scrubbing medium to remove sulphur components. The pure gas obtained from the scrubber is initially heated against to-be-scrubbed natural gas before it is subjected to work-performing decompression in an expansion turbine and thus cooled. In a downstream scrubbing apparatus the cold pure gas is subjected to a scrubbing operation with carbon-dioxide-free scrubbing medium, which is thus cooled and saturated with carbon dioxide.

Patent application EP0707880 likewise discloses a process for gas separation where, after heating against to-be-scrubbed crude synthesis gas, a synthesis gas obtained by methanol scrubbing is decompressed in an expansion turbine and thus cooled. The thus obtained cold is utilized in the process for cooling process streams.

As a result of the work-performing decompression in the turbine, energy which may be introduced into the electrical system of the plant or otherwise utilized is obtained in each case.

In principle a large pressure difference between the entry side and the exit side of the expansion machine is advantageous since this increases the recovered energy amount and also lowers the temperature of the expanded pure gas so that it may be more advantageously used for cooling purposes. However, low temperatures are problematic when components of the pure gas freeze out and form solids, since these can damage a turbine employed as an expansion machine in particular. Even when the temperature of the expanded pure gas is sufficiently high to safely avoid freezing-out of components in the expansion machine, the cold gas cannot usefully be utilized for cooling purposes when its use results in solids formation in a material stream to be cooled. The temperature of the pure gas below which solids formation takes place is referred to as the critical temperature.

It is therefore necessary to limit the exit temperature to a value above the critical temperature. The simplest way to achieve this is to not fully utilize the pressure difference available for the decompression via the expansion machine and to limit downward the pressure with which the pure gas leaves the expansion machine. However, the disadvantage of this is that both the energy obtainable in the expansion machine and the amount of cold from the decompressed pure gas utilizable in the process are reduced.

SUMMARY OF THE INVENTION

The problem addressed by the present invention is accordingly that of providing a method of the type described at the outset through which it is possible to fully utilize the available pressure difference in the expansion machine without suffering the disadvantages described.

The problem addressed is solved when the amount of heat supplied to the pure gas during heating thereof is deliberately altered to approximate the exit temperature thereof to a predetermined target value at all times.

The target value for the exit temperature is chosen to be as low as possible but also such that freezing-out of components of the to-be-decompressed pure gas or of a material stream cooled by the decompressed pure gas is safely precluded. It is preferable when the target value specified for the exit temperature is not less than 5° C. and not more than 10° C. above the critical temperature.

The critical temperature is generally strongly dependent on the composition of the to-be-decompressed pure gas, which may in some cases change during the gas scrubbing operation. To prevent freezing-out of components at any time it is proposed to analyse the composition of the pure gas continuously or at regular intervals, to determine from the results of the analysis the actual critical temperature and if necessary alter the target value for the exit temperature in order that it is at the desired interval from the critical temperature.

To perform the method according to the invention, a closed-loop control circuit may be provided in which the exit temperature of the pure gas is the controlled variable and the amount of heat supplied during heating of the pure gas or a parameter determining this amount of heat is the manipulated variable. However, particularly when the characteristic map of the expansion machine and the parameters of the to-be-decompressed pure gas are sufficiently precisely known, it is also possible to control the exit temperature using an open loop control means. For example in this case the temperature of the pure gas and the available pressure difference can be used to calculate the amount of heat which needs to be supplied to the pure gas to obtain an exit temperature lying within the desired temperature range.

Heating of the pure gas is effected in one or more steps, each step employing a heat exchanger which is used to transfer heat to the pure gas from a material stream which is usefully a process stream to be cooled inside the gas scrubber.

An advantageous configuration of the method according to the invention provides for supplying at least a portion of the pure gas at a variable flow rate in bypass to the or to at least one of the heat exchangers of the expansion machine used for pure gas heating. This makes it possible to achieve simple control of the amount of heat transferred during heating, which falls when increasing the flow rate run in bypass while rising when said flow rate is decreased. However, it is also possible to control the amount of heat transferred during heating of the pure gas via the amount of a material stream to be cooled in the heat exchanger.

While the decompression performed in accordance with the invention does prevent freezing-out, it does not prevent condensation of gas components, and the material stream exiting the expansion machine is therefore a liquid/gas mixture. The liquid/gas mixture is preferably separated into a liquid phase and a gas phase using a separator. The liquid phase often consists predominantly of the scrubbing medium employed for the gas scrubbing which—optionally after a processing operation—is usefully recycled from the separator and reused in the gas scrubber.

In a development of the method according to the invention it is proposed not to pass the entirety of the to-be-decompressed pure gas through the expansion machine but rather to run at least a portion of the pure gas in bypass to the expansion machine and thus decompress it via a throttling element. This may be useful both in normal operation of the gas scrubber, when for example for economic reasons an expansion machine of insufficient performance class is employed, or when in the case of a malfunction the expansion machine which is preferably an expansion turbine or two or more expansion turbines operable in parallel can only be operated under part load, if at all. In bypass the pure gas is preferably run past not only the expansion machine but also the separator used for phase separation.

The expansion machine is preferably coupled to a generator which generates electrical current which is utilized inside the gas scrubber and/or supplied to an external consumer for credit. The expansion machine may alternatively also be coupled to an assembly employed inside or outside the gas scrubber, for instance a scrubbing medium pump or a compressor, and power said assembly directly. The expansion machine may in particular be coupled to a compressor which increases the pressure of the crude gas supplied to the gas scrubber. This is advantageous particularly when the crude gas is run with a physical scrubbing medium since an increased crude gas pressure reduces the use of operating resources here.

The method according to the invention is suitable for use in gas scrubbers which employ for example methanol, ethanol, dimethylpolyethylene glycol ether (DMPEGE), N-methyl pyrrolidone (NMP), amines and derivatives thereof (for example methyldiethanolamine (MDEA), monoethanolamine (MEA) and diethanolamine (DEA)) and also mixtures of these substances as scrubbing media.

It is employed with particular advantage in the scrubbing of a crude synthesis gas comprising hydrogen, carbon monoxide, carbon dioxide and sulphur components, in which cryogenic methanol is used as the scrubbing medium.

BRIEF DESCRIPTION OF THE DRAWINGS

The invention shall be more particularly elucidated hereinbelow with reference to an exemplary embodiment depicted in schematic form in the FIGURE.

DETAILED DESCRIPTION OF THE INVENTION

The FIGURE shows a section of a gas scrubber in which acid gases are removed from a crude synthesis gas using a scrubbing medium, for example methanol or MDEA, to afford as pure gas a synthesis gas which is delivered as a product after a decompression according to the invention.

A crude synthesis gas 1 consisting predominantly of carbon monoxide, hydrogen and carbon dioxide and comprising sulphur components is supplied to the gas scrubber G and thus initially cooled in heat exchanger E1 and subsequently applied via conduit 2 to the absorber column A in the lower region thereof. The crude synthesis gas flows upward here and is thus brought into intensive contact with a scrubbing medium 3 supplied at the top of the absorber column, wherein predominantly carbon dioxide and sulphur components are removed. A synthesis gas largely free from sulphur components and at least reduced in carbon dioxide content can therefore be withdrawn via conduit 4. The scrubbing medium 5 laden with removed components is drawn from the bottom of the absorber column A and decompressed via the throttling element a into the separator D1 to transfer hydrogen and carbon monoxide coabsorbed during the gas scrubbing operation into the gas phase and for example via conduit 6 and compressor V recycle it into the crude synthesis gas 1. The liquid phase 7 obtained in separator D1 and essentially now laden only with carbon dioxide and sulphur components is decompressed via the throttling element b onto the top of the hot regeneration column N heated via the boiler K in which a sulphur- and carbon-dioxide-rich gas phase 8 and a regenerated scrubbing medium 9, which is largely free from sulphur components and carbon dioxide and may subsequently be subjected to further regeneration steps, are obtained.

The sulphur- and carbon-dioxide-rich gas phase 8 is divided into the two substreams 10 and 11 of which the one stream 10 is cooled in heat exchanger E2 against the synthesis gas 4 obtained in the absorber column A, thus heating said synthesis gas. Via conduit 14 the heated synthesis gas is supplied to the expansion turbine T and therein cooled down again by work-performing decompression. The second substream 11 run in bypass to the heat exchanger E2 likewise has heat removed from it in heat exchanger E3 by a coolant 12 before it is combined with the cooled substream 10 and via conduit 13 sent for economic recovery—for example in a Claus plant (not shown).

The amount of heat transferred to the synthesis gas 4 in heat exchanger E2 is determined by the substream 10 the size of which, via the two valves c and d, is adjusted such that the decompressed synthesis gas 15 leaves the expansion turbine T at a temperature approximated to a predetermined target value at all times. The target value is chosen such that the pressure difference available for the decompression may be fully exploited while freezing-out of synthesis gas components is safely precluded.

The decompression in the expansion turbine T causes condensation in particular of scrubbing medium residues present in the synthesis gas 14 which are removed from the material stream 15 in the separator D2 so that a synthesis gas 16 having product purity may be withdrawn and after heating against crude synthesis gas 1 in the heat exchanger E1 may be delivered as gas product 17. The liquid phase 18 obtained in separator D2 is optionally processed and run back to the absorber column A as scrubbing medium.

If on account of a malfunction utilization of the expansion turbine T is not possible, the synthesis gas 4 is run via the shutoff element e and the conduit 19 in bypass to the heat exchanger E2, to the turbine T and to the separator D2 and without any further treatment sent via conduit 16 to the heat exchanger E1.

What we claim is:

1. A method for operating a gas scrubber and an expansion machine comprising:

scrubbing a crude gas comprising hydrogen, carbon monoxide, carbon dioxide, and a sulphur component with a chemical or physical scrubbing medium to obtain a pure gas comprising hydrogen and carbon monoxide and a liquid phase stream comprising the scrubbing medium, the sulphur component, and carbon dioxide;

separating the liquid phase stream in a regeneration column into a sulphur- and carbon-dioxide-rich gas phase stream and a regenerated scrubbing medium stream;

dividing the sulphur- and carbon-dioxide-rich gas phase stream into a first substream and a second substream;

heating the pure gas with the first substream to obtain a heated pure gas;

combining the first substream, after the heating of the pure gas, with the second substream;

introducing the heated pure gas into an expansion machine to conduct a decompression step to produce energy;

wherein the heated pure gas has a pressure difference between the heated pure gas before entering into the expansion machine and after leaving the expansion machine, and wherein an amount of heat supplied to the pure gas during the heating thereof is deliberately altered to adjust an exit temperature, at which the heated pure gas leaves the expansion machine, to a predetermined target value at all times, whereby the target value is higher than a critical temperature of the pure gas.

2. The method according to claim 1, characterized in that the target value for the exit temperature is not more than 10° C. and not less than 5° C. above the critical temperature of the pure gas.

3. The method according to claim 1, characterized in that the target value for the exit temperature is altered as a function of composition of the pure gas.

4. The method according to claim 1, characterized in that the scrubbing medium comprises methanol.

\* \* \* \* \*